United States Patent
Lee et al.

(10) Patent No.: US 9,722,217 B2
(45) Date of Patent: Aug. 1, 2017

(54) POUCH TYPE BATTERY CELL

(71) Applicant: SAMSUNG SDI CO., LTD., Yongin-si, Gyeonggi-do (KR)

(72) Inventors: Jeong-Doo Lee, Yongin-si (KR); Seok-Gyun Chang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 38 days.

(21) Appl. No.: 14/335,807

(22) Filed: Jul. 18, 2014

(65) Prior Publication Data

US 2015/0044547 A1 Feb. 12, 2015

(30) Foreign Application Priority Data

Aug. 7, 2013 (KR) .................. 10-2013-0093575

(51) Int. Cl.
*H01M 2/02* (2006.01)

(52) U.S. Cl.
CPC ......... *H01M 2/0287* (2013.01); *H01M 2/026* (2013.01); *H01M 2/0217* (2013.01)

(58) Field of Classification Search
CPC ... H01M 2/026; H01M 2/0287; H01M 2/0217
See application file for complete search history.

(56) References Cited

U.S. PATENT DOCUMENTS

| | | | |
|---|---|---|---|
| 6,841,298 B2 * | 1/2005 | Yamashita et al. | 429/179 |
| 7,262,956 B2 | 8/2007 | Suzuki et al. | |
| 2002/0146621 A1 * | 10/2002 | Yageta et al. | 429/181 |
| 2003/0180609 A1 * | 9/2003 | Yamashita et al. | 429/185 |
| 2005/0100784 A1 * | 5/2005 | Yageta et al. | 429/160 |
| 2005/0136324 A1 * | 6/2005 | Yamada et al. | 429/175 |
| 2006/0073383 A1 * | 4/2006 | Han et al. | 429/176 |
| 2006/0093908 A1 * | 5/2006 | Hwang et al. | 429/185 |
| 2007/0015062 A1 * | 1/2007 | Lee et al. | 429/329 |
| 2008/0292956 A1 | 11/2008 | Hong et al. | |
| 2011/0015323 A1 * | 1/2011 | Hundley | C08K 5/134 524/320 |
| 2012/0155001 A1 | 6/2012 | Fujikawa et al. | |
| 2013/0004835 A1 * | 1/2013 | Roy | 429/185 |

FOREIGN PATENT DOCUMENTS

| | | |
|---|---|---|
| JP | 11-065762 | 3/1999 |
| JP | 2001-083896 | 3/2001 |
| JP | 2001-266826 | 9/2001 |
| JP | 2005-166644 | 6/2005 |
| JP | 2007-161310 * | 6/2007 |
| JP | 2012-226826 | 11/2012 |
| JP | 2013-041788 | 2/2013 |
| KR | 10-2005-0046636 | 5/2005 |
| KR | 10-2006-0010652 | 2/2006 |
| KR | 10-0864887 | 10/2008 |
| KR | 10-2012-0042537 | 5/2012 |
| KR | 10-2013-0030723 | 3/2013 |

OTHER PUBLICATIONS

Machine translation of JP 2007-161310, published in Jun. 2007.*

* cited by examiner

*Primary Examiner* — Anca Eoff
(74) *Attorney, Agent, or Firm* — Lewis Roca Rothgerber Christie LLP

(57) ABSTRACT

A pouch type battery cell includes an electrode assembly having a first electrode plate, a second electrode plate, and a separator located between the first and second electrode plates; a first case having a first accommodating portion in which at least one portion of the electrode assembly is accommodated, wherein the first accommodating portion is generally concave; and a second case covering the first case, wherein the first case includes a metal layer including steel or hard aluminum, and wherein a depth of the first accommodating portion is between about 1 mm and about 4 mm, and wherein a thickness of the metal layer is between about 40 μm and about 100 μm.

7 Claims, 6 Drawing Sheets

POUCH TYPE BATTERY CELL

CROSS-REFERENCE TO RELATED APPLICATION

This application claims priority to and the benefit of Korean Patent Application No. 10-2013-0093575, filed on Aug. 7, 2013, in the Korean Intellectual Property Office, the entire content of which is incorporated in its entirety herein by reference.

BACKGROUND

1. Field

An aspect of the present invention relates to a pouch type battery cell.

2. Description of the Related Art

Recently, battery cells have been used as power sources of portable electronic devices. As portable electronic devices are used in various fields, demands on battery cells have increased. The battery cells can be charged/discharged a plurality of times, and accordingly are economically and environmentally efficient.

Desired characteristics for electronic devices are that they are small and lightweight, so small and lightweight battery cells are also desired. A pouch type battery cell which is small in size and light weight are available, but since a material such as lithium having high reactivity is provided inside the pouch type battery cell, the safety of the pouch type battery cell should be maintained.

SUMMARY

Embodiments provide a pouch type battery cell that is safe while also being small and light.

According to an aspect of the present invention, there is provided a pouch type battery cell, including: an electrode assembly configured to include a first electrode plate, a second electrode plate and a separator located between the first and second electrode plates; a first case configured to have a first accommodating portion in which at least one portion of the electrode assembly is accommodated, wherein the first accommodating portion is formed concave; and a second case configured to cover the first case, wherein the first case includes a metal layer configured to include steel or hard aluminum, and wherein the depth of the first accommodating portion is 1 to 4 mm, and the thickness of the metal layer is 40 to 100 μm.

The value obtained by dividing the thickness of the metal layer into the depth of the first accommodating portion may be 10 to 120.

The metal layer may include steel, and the value obtained by dividing the thickness of the metal layer into the depth of the first accommodating portion may be 10 to 40.

The thickness of the metal layer may be 51 to 100 μm.

The metal layer may include hard aluminum, and the value obtained by dividing the thickness of the metal layer into the depth of the first accommodating portion may be 20 to 120.

The thickness of the metal layer may be 40 to 50 μm.

Each of the first and second cases may include a first insulating layer, a metal layer laminated on the first insulating layer, and a second insulating layer laminated on the metal layer. The first insulating layer of the first case and the first insulating layer of the second case may be opposite to each other.

The first insulating layer of the first case and the first insulating layer of the second case may be bonded at edges of the first and second cases, thereby forming a sealing portion.

The first insulating layer may include polypropylene (PP), and the second insulating layer may include nylon or polyethylene terephthalate (PET).

A second accommodating portion configured to accommodate at least one portion of the electrode assembly may be formed concave in the second case.

The second accommodating portion may include a metal layer configured to include steel or hard aluminum.

The depth of the second accommodating portion may be 1 to 4 mm, and the thickness of the metal layer of the second accommodating portion may be 40 to 100 μm.

The steel may include any one selected from STS301, STS304, STS305, STS316L and STS321 of Korean Standard (KS), or any one selected from SUS301, SUS304, SUS305, SUS316L and SUS321 of Japanese Industrial Standard (JIS).

The hard aluminum may include any one selected from 3003-O JIS H 4160 and 3004-O JIS H 4160, which are aluminum not subjected to an annealing process.

Other features and advantages of the present invention will become more fully apparent from the following detailed description, taken in conjunction with the accompanying drawings.

Terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

According to the pouch type battery cell of the present invention, the metal layer of the case is made of steel or hard aluminum, so that it is possible to improve the strength and safety of the pouch type battery cell and to implement the light weight and small size of the pouch type battery cell.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
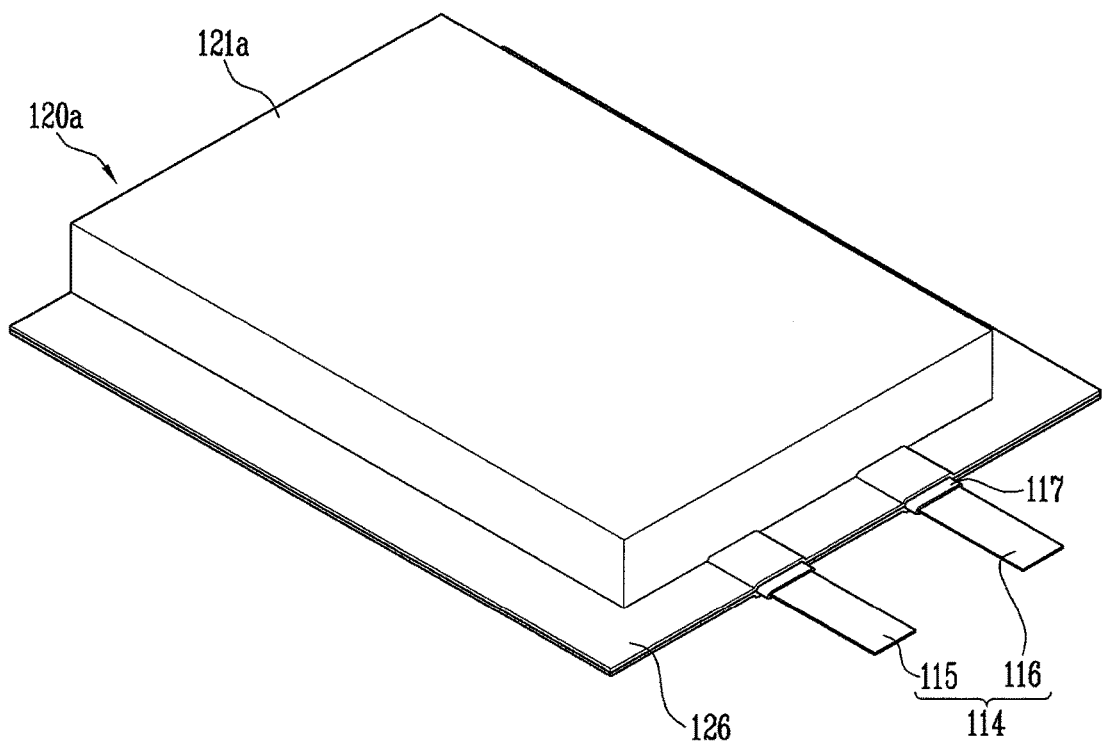
FIG. 1 is a perspective view of a pouch type battery cell according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Figure 2:
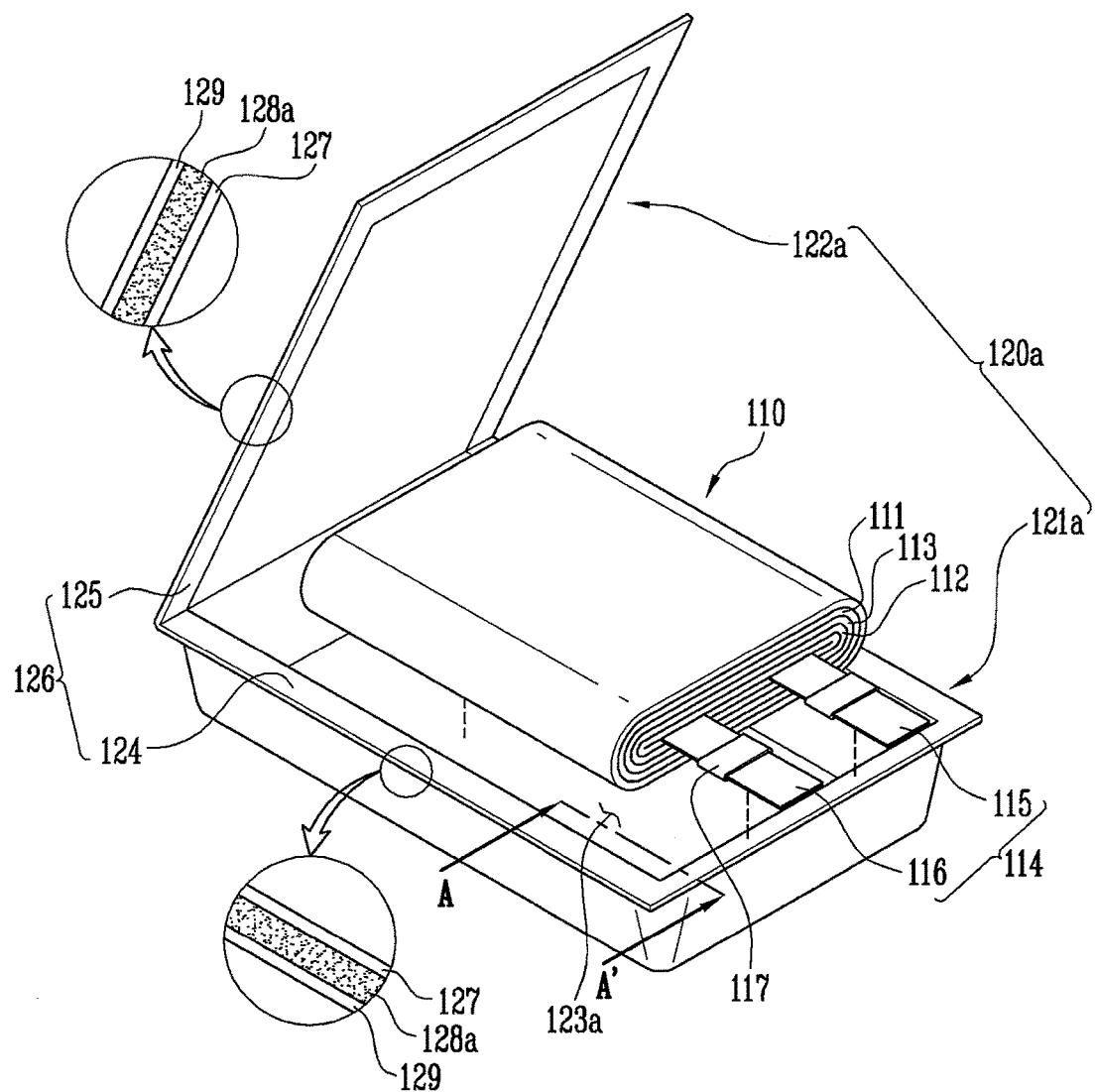
FIG. 2 is an exploded perspective view of the pouch type battery cell shown in FIG. 1.

FIG. 1 is a perspective view of a pouch type battery cell 100a according to an embodiment of the present invention. FIG. 2 is an exploded perspective view of the pouch type battery cell 100a shown in FIG. 1. Here, FIG. 2 is an exploded perspective view in which the pouch type battery cell 100a of FIG. 1 is turned over and then developed. Hereinafter, the pouch type battery cell 100a according to this embodiment will be described with reference to FIGS. 1 and 2.

As shown in FIGS. 1 and 2, the pouch type battery cell 100a includes an electrode assembly 110 and a case 120a configured to accommodate the electrode assembly 110 therein. The case 120a may include a metal layer 128a including steel.

The electrode assembly 110 is a member in which ions or electrons are moved through an interaction between the electrode assembly 110 and an electrolyte, which are accommodated together in the case 120a, thereby generating electrochemical energy.

In one embodiment, the electrode assembly 110 has an electrode tab 114 provided at one side thereof. The electrode assembly 110 constitutes, together with the case 120a, the pouch type battery cell 100a, thereby and is configured to generate electrochemical energy through the movement of ions or electrons. The electrode assembly 110 may include a first electrode plate 111, a second electrode plate 112, a separator 113 located between the first and second electrode plates 111 and 112. The electrode tab 114 is configured to include first and second electrode tabs 115 and 116 protruding from the electrode assembly 110. In this case, the first and second electrode plates 111 and 112 may include positive and negative electrode plates, respectively. The first and second electrode tabs 115 and 116 may have positive and negative electrodes, respectively. The electrode tab 114 protrudes from one side of the electrode assembly 110 to the outside of the pouch type battery cell 100a through a sealing portion 126 of the case 120a, so that the electrochemical energy generated inside the pouch type battery cell 100a can be transferred to the outside of the pouch type battery cell 100a.

The electrode assembly 110 may be manufactured by various methods including a method of winding or stacking the first electrode plate 111, the second electrode plate 112 and the separator 113. In embodiments of the present invention, it will be apparent that the electrode assembly 110 may be one of various types of electrode assembly, including a stacked type, a wound type, etc.

The case 120a is a member which accommodates the electrode assembly 110 therein, and may include a first case 121a and a second case 122a.

In this embodiment, a first accommodating portion 123a may be formed concave in the first case 121a, and the electrode assembly 110 may be accommodated in the first accommodating portion 123a. The first accommodating portion 123a may be manufactured through a deep drawing process in which a hollow container without any joints is made using a flat plate. The second case 122a is formed in a shape covering the first case 121a having the electrode assembly 110 accommodated therein. Unlike the first case 121a, the second case 122a may have a flat plate shape.

In one embodiment, each of the first and second cases 121a and 122a may have a structure in which a first insulating layer 127, the metal layer 128a, and a second insulating layer 129 are sequentially laminated. In other words, the first insulating layer 127 of the first case 121a and the first insulating layer 127 of the second case 122a may be adjacent and opposite to each other, and the second insulating layer 129 of the first case 121a and the second insulating layer 129 of the second case 122a may form the external appearance of the case 120a. In this case, the first insulating layer 127 may include, for example, polypropylene such as cast polypropylene (CPP). Accordingly, the sealing portion 126 is formed by thermally fusing an edge 124 of the first case 121a and an edge 125 of the second case 122a in a state in which the first and second cases 121a and 122a are adhered closely to each other after the electrode assembly 110 is accommodated in the first accommodating portion 123a of the first case 121a, so that the case 120a can be manufactured. In one embodiment, because the second insulating layer 129 forms an outer surface of the case 120a, the second insulating layer 129 may include a resin material such as nylon or polyethylene terephthalate (PET), which provides sufficient strength to prevent significant damage to the battery due to external impact.

In this embodiment, the metal layer 128a may include, for example, steel such as any one selected from STS301, STS304, STS305, STS316L and STS321 of Korean Standard (KS) (or any one selected from SUS301, SUS304, SUS305, SUS316L and SUS321 of Japanese Industrial Standard (JIS)). In one embodiment, the metal layer 128a may include stainless steel. Accordingly, it is possible to remarkably improve the strength and the like of the case 120a, as compared with the existing case made of soft aluminum, while decreasing the thickness of the metal layer 128a. Thus, the safety of the pouch type battery cell 100a according to this embodiment can be improved by complementing the weakness of the existing pouch type battery cell. Accordingly, the pouch type battery cell 100a can be used as not only an internal battery of a terminal such as a cellular phone but also as an attachable/detachable external battery. Further, the light weight and small size of the pouch battery cell 100a can be maintained. When the pouch type battery cell 100a according to this embodiment is used as an external battery, the pouch type battery cell 100a may be surrounded by a general label so that information about the battery can be displayed on the label.

In one embodiment, because the metal layer 128a made of steel has conductivity, the metal layer 128a can be configured so that it is not short-circuited with the electrode tab 114. Particularly, if the metal layer 128a is exposed to the outside of the case 120a at an end of the sealing portion 126, the exposed metal layer 128a may be short-circuited with the electrode tab 114. In order to solve such a problem, a film 117 may be further provided to the electrode tab 114 according to this embodiment. In one embodiment, the film 117 may be mounted on the sealing portion 126. In one embodiment, the film 117 is made of an electrical nonconductor so that it is possible to prevent a short circuit between the electrode tab 114 and the metal layer 128a. Further, in one embodiment, the film 117 is made of a material similar to the first insulating layer 127 in the sealing portion 126 to assist the sealing portion 126 to be completely thermally fused. Accordingly, the electrode tab 114 made of metal can be closely adhered to the sealing portion 126. As a result, the sealing performance of the case 120a can be reinforced by the film 117.

Figure 3:
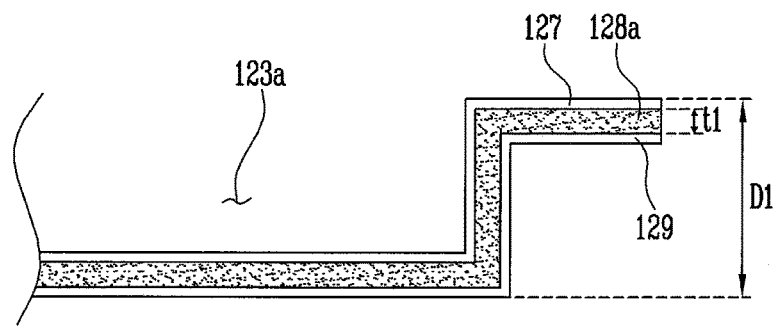
FIG. 3 is a sectional view taken along line A-A' of a first case of the pouch type battery cell shown in FIG. 2.

FIG. 3 is a sectional view taken along line A-A' of a first case of the pouch type battery cell 100a shown in FIG. 2. Hereinafter, the case 120a according to this embodiment will be described in detail with reference to FIG. 3.

As described above, in one embodiment the metal layer 128a of the case 120a is made of steel. Steel is a material having high tensile strength and low elongation compared to soft aluminum, and hence the processability or malleability of the steel is lower than aluminum. Particularly, it may be difficult to form the first accommodating portion 123a in the first case 121a. For example, an undesired wrinkle or bending may occur in the first case 121a in the deep drawing process for forming the first accommodating portion 123a. In a serious case, a crack may occur in the first accommodating portion 123a. Particularly, when the pouch type battery cell 100a is used as attachable/detachable external battery, the external appearance of the battery is more important. Therefore, any defects should be prevented in the first case 121a when the first accommodating portion 123a is formed.

Accordingly, a correlation between the thickness of the first accommodating portion 123a and the thickness of the metal layer 128a has been developed. Specific experimental results are shown in the following Table 1.

TABLE 1

| Classification | t1 | D1 | D1/t1 | Result |
| --- | --- | --- | --- | --- |
| Embodiment 1 | 100 | 1 | 10 | ○ |
| Embodiment 2 | 100 | 2 | 20 | ○ |
| Embodiment 3 | 100 | 3 | 30 | ○ |
| Embodiment 4 | 100 | 4 | 40 | ○ |
| Comparative Example 1 | 100 | 5 | 50 | X |
| Comparative Example 2 | 100 | 6 | 60 | X |
| Embodiment 5 | 51 | 1 | 19.608 | ○ |
| Embodiment 6 | 51 | 1.53 | 30 | ○ |
| Embodiment 7 | 51 | 2.04 | 40 | ○ |
| Comparative Example 3 | 51 | 4.3 | 84.314 | X | t1: Thickness (μm) of metal layer 128a
D1: Depth (mm) of first accommodating portion 123a When the depth D1 of the first accommodating portion 123 was 1, 2, 3 or 4 mm (Embodiment 1 to 4) when the thickness t1 of the metal layer 128a was 100 μm, no wrinkles or cracks occurred in the metal layer 128a of the first case 121a. When the depth D1 of the first accommodating portion 123a was 5 or 6 mm (Comparative Example 1 or 2), a wrinkle or crack occurred in the metal layer 128a. When the depth D1 of the first accommodating portion 123a was 1, 1.53 or 2.04 mm (Embodiment 5 to 7) when the thickness t1 of the metal layer 128a was 51 μm, no wrinkles or cracks occurred in the metal layer 128a. When the depth D1 of the first accommodating portion 123a was 4.3 mm (Comparative Example 3), a wrinkle or crack occurred in the metal layer 128a. As a result, it can be derived that when D1/t1 as a value obtained by dividing the thickness t1 of the metal layer 128a into the depth D1 of the accommodating portion 123a is 40 or less, no wrinkles or cracks occur in the first case 121a or the metal layer 128a. In addition, it can be derived that when the depth D1 of the first accommodating portion 123a is set to 1 to 4 mm and the thickness t1 of the metal layer 128a is set to 40 to 100 μm, no wrinkles or cracks occur in the first case 121a or the metal layer 128a.

In one embodiment, the total thickness of the metal layer 128a, the first insulating layer 127 and the second insulating layer 129 may be about 162 μm.

Figure 4:
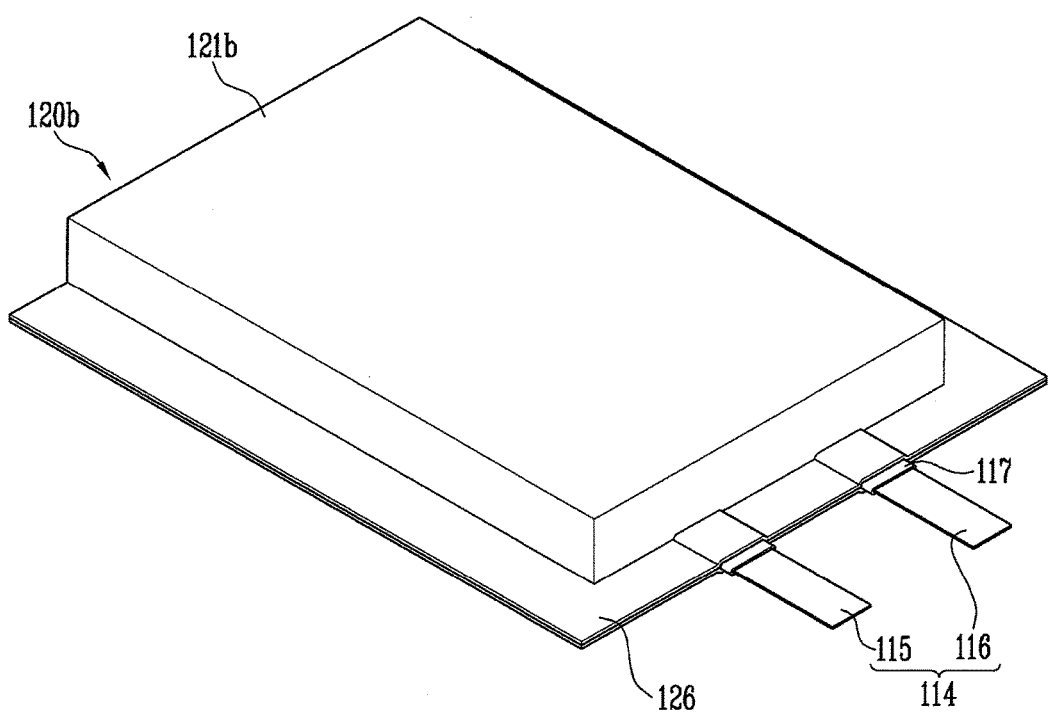
FIG. 4 is a perspective view of a pouch type battery cell according to another embodiment of the present invention.
Figure 5:
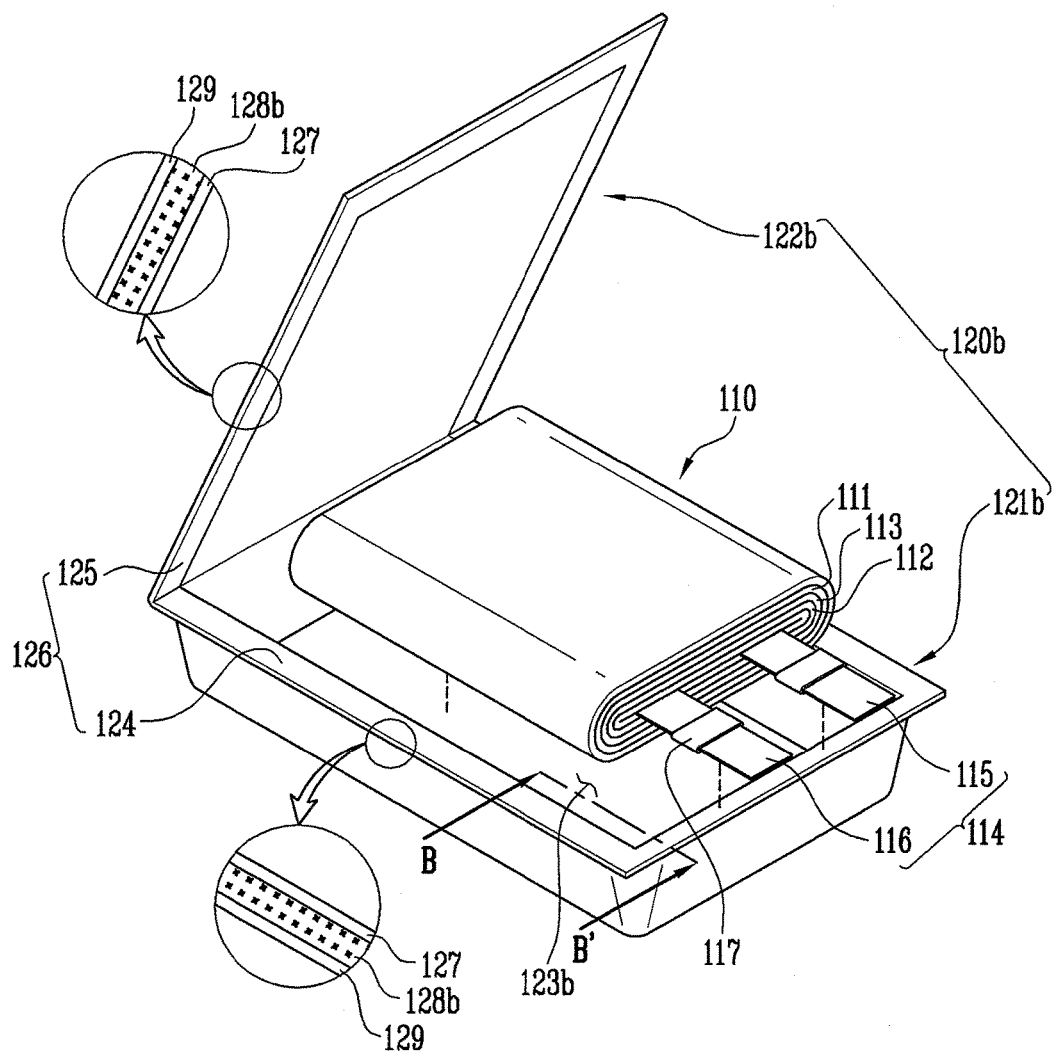
FIG. 5 is an exploded perspective view of the pouch type battery cell shown in FIG. 4.

FIG. 4 is a perspective view of a pouch type battery cell 100b according to another embodiment of the present invention. FIG. 5 is an exploded perspective view of the pouch type battery cell 100b shown in FIG. 4. Here, FIG. 5 is an exploded perspective view in which the pouch type battery cell 100b of FIG. 4 is turned over and then developed. Hereinafter, the pouch type battery cell 100b according to this embodiment will be described with reference to FIGS. 4 and 5. In this embodiment, components identical or corresponding to those of the aforementioned embodiment are designated by like reference numerals, and their detailed descriptions will be omitted to avoid redundancy.

As shown in FIGS. 4 and 5, the pouch type battery cell 100b according to this embodiment includes an electrode assembly 110 and a case 120b configured to accommodate the electrode assembly 110 therein. The case 120b may include a metal layer 128b configured to include hard aluminum.

When the first and second cases 121b and 122b have the metal layer 128b including hard aluminum, the strength of the case 120b can be improved as compared to cases having soft aluminum. Thus, the pouch type battery cell 100b according to this embodiment can be used as an external battery without any separate reinforcing plate or reinforcing label. Further, the light weight and small size of the pouch battery cell 100b can be maintained.

In this case, the metal layer 128b may use, for example, Al6061 or hard aluminum such as 3003-O JIS H 4160 or 3004-O JIS H 4160 which is aluminum not subjected to an annealing process.

Figure 6:
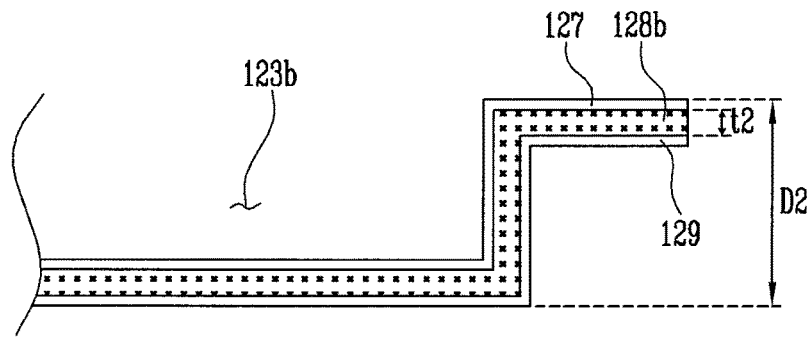
FIG. 6 is a sectional view taken along line B-B' of a first case of the pouch type battery cell shown in FIG. 5.

FIG. 6 is a sectional view taken along line B-B' of a first case of the pouch type battery cell 100b shown in FIG. 5. Hereinafter, the case 120b according to this embodiment will be described in detail with reference to FIG. 6.

When the metal layer 128b of the case 120b is made of hard aluminum, the hard aluminum has high tensile strength and low elongation, and hence it may be difficult to form a first accommodating portion 123b. Accordingly, a correlation between the thickness of the first accommodating portion 123b and the thickness of the metal layer 128b when the metal layer 128b is made of hard aluminum has been developed. Specific experimental results are shown in the following Table 2.

TABLE 2

| Classification | t2 | D2 | D2/t2 | Result |
|---|---|---|---|---|
| Embodiment 1 | 50 | 1 | 20 | ○ |
| Embodiment 2 | 50 | 2 | 40 | ○ |
| Embodiment 3 | 50 | 3 | 60 | ○ |
| Embodiment 4 | 50 | 4 | 80 | ○ |
| Embodiment 5 | 50 | 5 | 100 | ○ |
| Embodiment 6 | 50 | 6 | 120 | ○ |
| Comparative Example 1 | 50 | 7 | 140 | X |
| Comparative Example 2 | 50 | 8 | 160 | X |
| Embodiment 7 | 40 | 1 | 25 | ○ |
| Embodiment 8 | 40 | 2 | 50 | ○ |
| Embodiment 9 | 40 | 3 | 75 | ○ |
| Embodiment 10 | 40 | 4 | 100 | ○ |
| Embodiment 11 | 40 | 4.8 | 120 | ○ |
| Comparative Example 3 | 40 | 5.5 | 137.5 | X |
| Comparative Example 4 | 40 | 7 | 175 | X |
| Comparative Example 5 | 40 | 8 | 200 | X | t2: Thickness (μm) of metal layer 128b
D1: Depth (mm) of first accommodating portion 123b First, in a case where the depth D2 of the first accommodating portion 123b was 1, 2, 3, 4, 5 or 6 mm (Embodiment 1 to 6) when the thickness t2 of the metal layer 128b was 50 μm, no wrinkles or cracks occurred in the metal layer 128b of the first case 121b. When the depth D2 of the first accommodating portion 123b was 7 or 8 mm (Comparative Example 1 or 2), a wrinkle or crack occurred in the metal layer 128b. When the depth D2 of the first accommodating portion 123b was 1, 2, 3, 4 or 4.8 mm (Embodiment 7 to 11) when the thickness t2 of the metal layer 128b was 40 μm, no wrinkles or cracks occurred in the metal layer 128b. When the depth D2 of the first accommodating portion 123b was 7 or 8 mm (Comparative Example 4 or 5), a wrinkle or crack occurred in the metal layer 128b. As a result, it can be derived that when D2/t2 as a value obtained by dividing the thickness t2 of the metal layer 128b into the depth D2 of the first accommodating portion 123b is 120 or less, no wrinkles or cracks occur in the first case 210b or the metal layer 128b. Further, it can be derived that when the depth D2 of the first accommodating portion 123b is set to 1 to 4 mm and the thickness t2 of the metal layer 128b is set to 40 to 100 μm, no wrinkles or cracks occur in the first case 121b or the metal layer 128b. When the depth D2 of the first accommodating portion 123b exceeds 4 mm, there exists a section in which no wrinkles or cracks occur in the metal layer 128b. However, when considering that the pouch type battery cell 100b according to this embodiment is used as an external battery while decreasing the thickness of the battery, the depth D2 of the first accommodating portion 123b may be set to 4 mm or less.

In one embodiment, the total thickness of the metal layer 128b, the first insulating layer 127 and the second insulating layer 129 may be about 121 μm.

Figure 7:
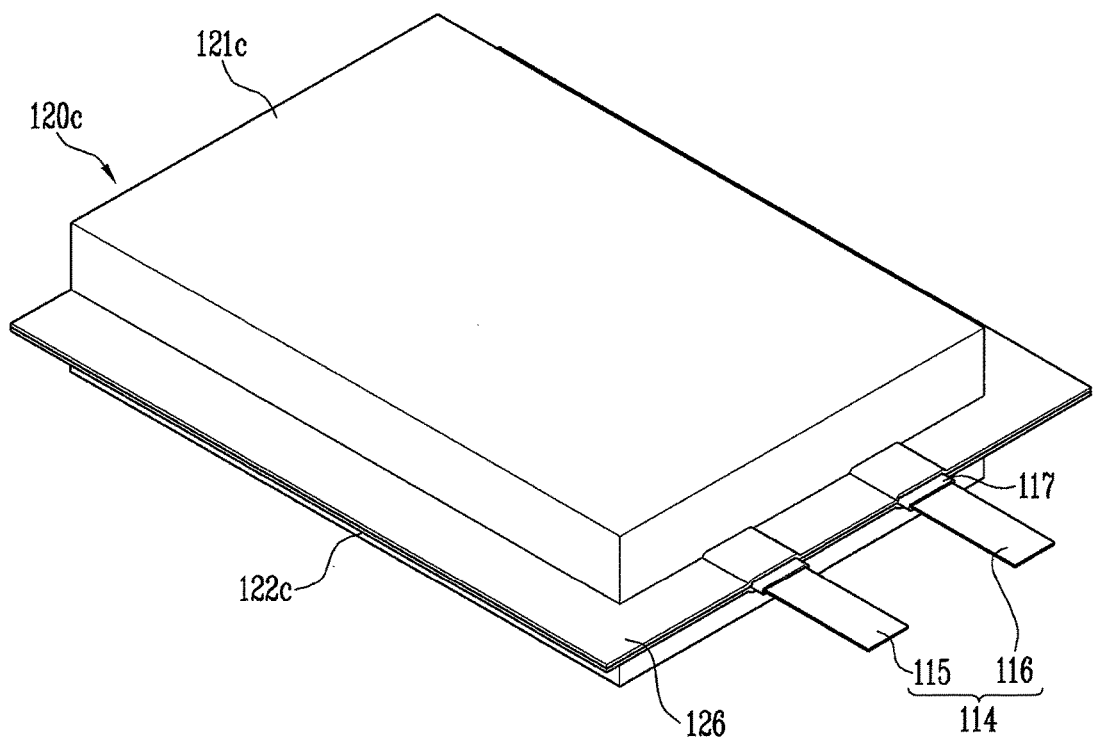
FIG. 7 is a perspective view of a pouch type battery cell according to still another embodiment of the present invention.
Figure 8:
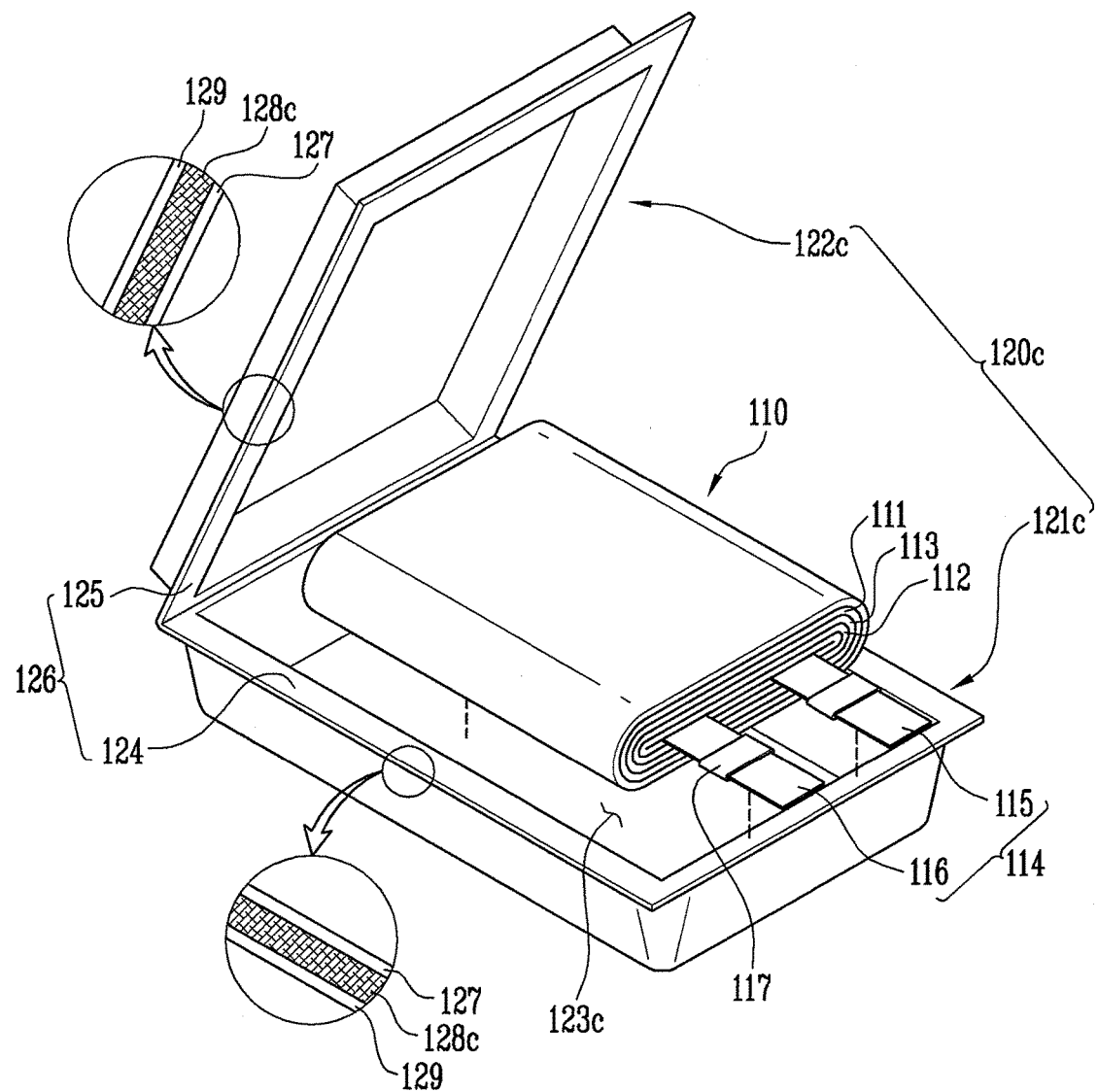
FIG. 8 is an exploded perspective view of the pouch type battery cell shown in FIG. 7.

FIG. 7 is a perspective view of a pouch type battery cell 100c according to still another embodiment of the present invention. FIG. 8 is an exploded perspective view of the pouch type battery cell 100c shown in FIG. 7. Here, FIG. 8 is an exploded perspective view in which the pouch type battery cell 100c of FIG. 7 is turned over and then developed. Hereinafter, the pouch type battery cell 100c according to this embodiment will be described with reference to FIGS. 7 and 8. In this embodiment, components identical or corresponding to those of the aforementioned embodiment are designated by like reference numerals, and their detailed descriptions will be omitted to avoid redundancy.

As shown in FIGS. 7 and 8, the pouch type battery cell 100c according to this embodiment includes an electrode assembly 110 and a case 120c. A first accommodating portion 123c may be formed in a first case 121c, and a second accommodating portion 123d may be formed in a second case 122c.

As described above, when a metal layer 128c of the case 120c includes steel or hard aluminum, the depth of the first accommodating portion 123c may be limited with respect to the thickness of the metal layer 128c. However, there may exist a case where the capacity of the pouch type battery cell 100c is necessarily increased or where the height of the electrode assembly 110 is necessarily increased in the design of a terminal such as a cellular phone. In this case, it is possible to solve such a problem by forming the second accommodating portion 123d in the second case 122c.

In other words, if one side and the other side of the electrode assembly 110 are respectively accommodated in the first and second accommodating portions 123c and 123d by forming the second accommodating portion 123d in the second case 122c, each of the first and second accommodating portions 123c and 123d can accommodate only a portion of the electrode assembly 110 even though the height of the electrode assembly 110 is high. Thus, the depth of the first accommodating portion 123c may not be deeply formed. For example, if the metal layer 128c is made of steel and has a thickness of 100 μm, the depth of the first accommodating portion 123c is principally 4 mm. However, if the height of the electrode assembly 110 is 5 mm, the second accommodating portion 123d is formed in the second case 122c so that the depth of each of the first and second accommodating portions 123c and 123d is implemented to an extent where the first and second accommodating portions 123c and 123d can accommodate the electrode assembly 110. Thus, it is possible to prevent a wrinkle or crack from occurring in the case 120c. When the metal layer 128c includes steel, the second accommodating portion 123d is set so that the value obtained by dividing the thickness of the metal layer 128c into the depth of the second accommodating portion 123d is 40 or less. Thus, it is possible to prevent a wrinkle or crack from occurring in the second case 122c. When the metal layer 128c includes hard aluminum, the second accommodating portion 123d is set so that the value obtained by dividing the thickness of the metal layer 128c into the depth of the second accommodating portion 123d is 120 or less. Thus, it is possible to prevent a wrinkle or crack from occurring in the second case 122c.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A pouch type battery cell comprising:
an electrode assembly comprising a first electrode plate, a second electrode plate, and a separator located between the first and second electrode plates;
a first case comprising a first accommodating portion in which at least one portion of the electrode assembly is accommodated, wherein the first accommodating portion is generally concave; and a second case covering the first case, wherein the first case and the second case each include a metal layer comprising 3003-O JIS H 4160 and 3004-O JIS H 4160 hard aluminum that has not been annealed located between and directly contacting a first and a second insulating layer, and wherein a depth of the first accommodating portion is between about 1 mm and about 4 mm, and wherein a thickness of the metal layer is between about 40 μm and about 100 μm.

2. The pouch type battery cell of claim 1, wherein the thickness of the metal layer is between about 51 and about 100 μm.

3. The pouch type battery cell of claim 1, wherein the value obtained by dividing the thickness of the metal layer into the depth of the first accommodating portion is between 20 and 120.

4. The pouch type battery cell of claim 3, wherein the thickness of the metal layer is between about 40 and about 50 μm.

5. The pouch type battery cell of claim 1, wherein the first insulating layer of the first case and the first insulating layer of the second case are bonded at edges of the first and second cases, thereby forming a sealing portion.

6. The pouch type battery cell of claim 1, wherein the first insulating layer includes polypropylene, and the second insulating layer includes nylon or polyethylene terephthalate.

7. The pouch type battery cell of claim 1, wherein a second accommodating portion configured to accommodate at least one portion of the electrode assembly is formed generally concave in the second case.

* * * * *